Dec. 19, 1961  J. V. FOX  3,013,350
TOOL ATTACHMENTS FOR TRACTORS
Filed Sept. 19, 1960  3 Sheets-Sheet 1
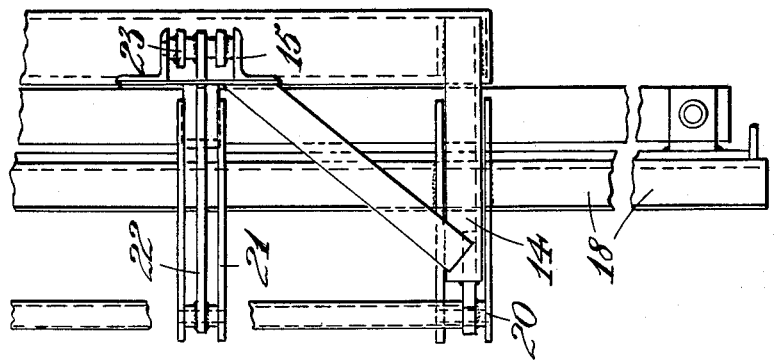
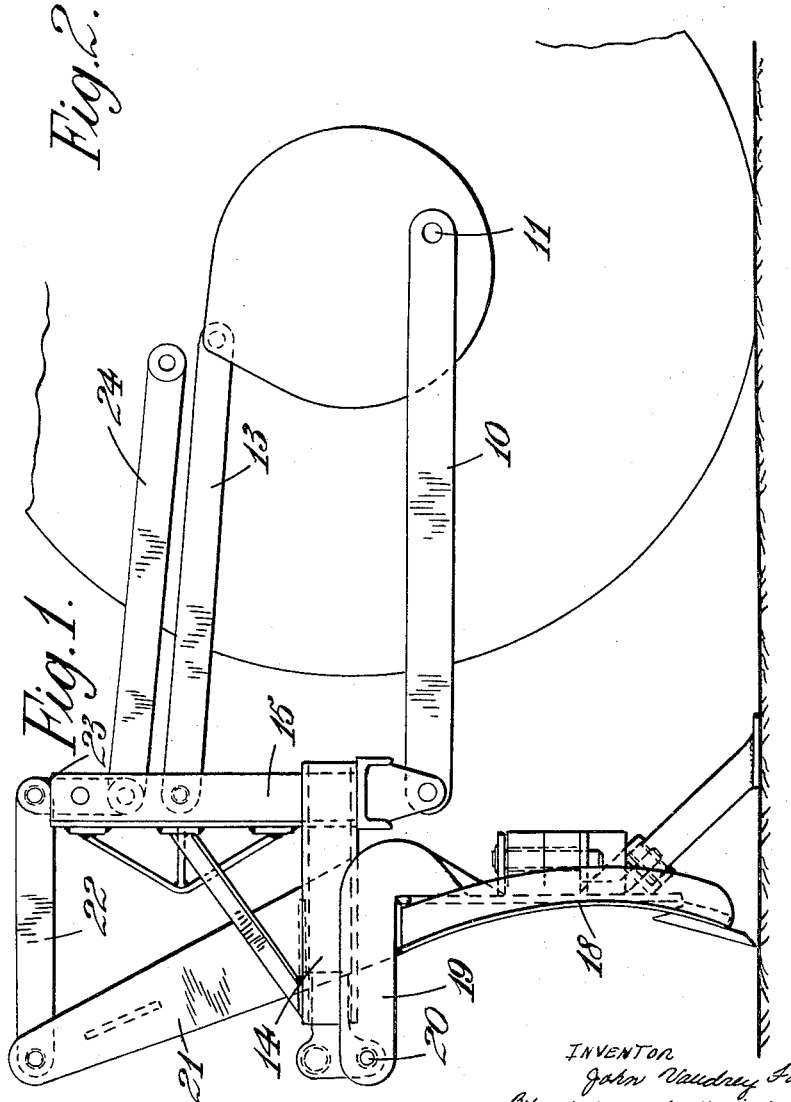
INVENTOR
John Vaudrey Fox
BY Watson, Cole, Grindle & Watson
ATTORNEYS

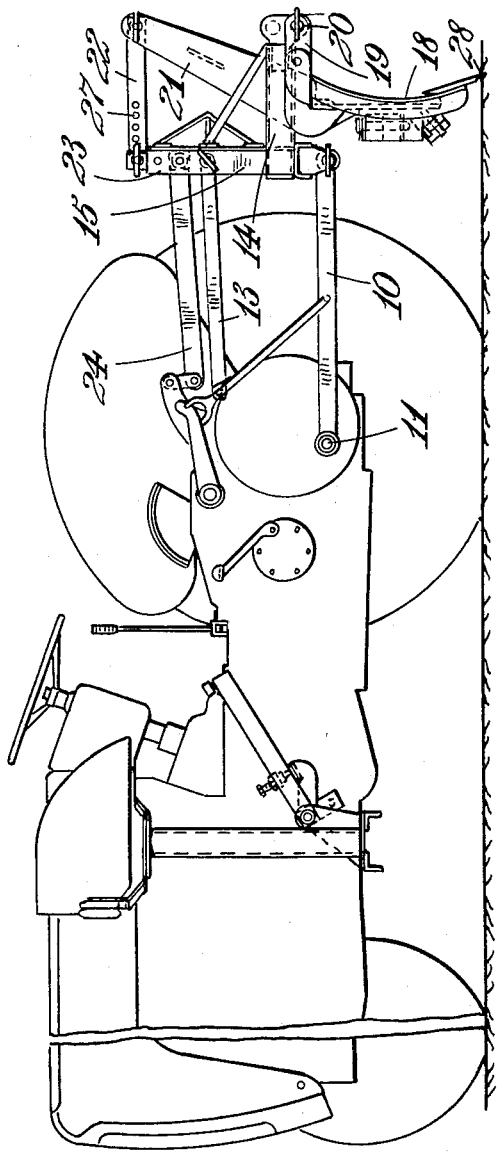

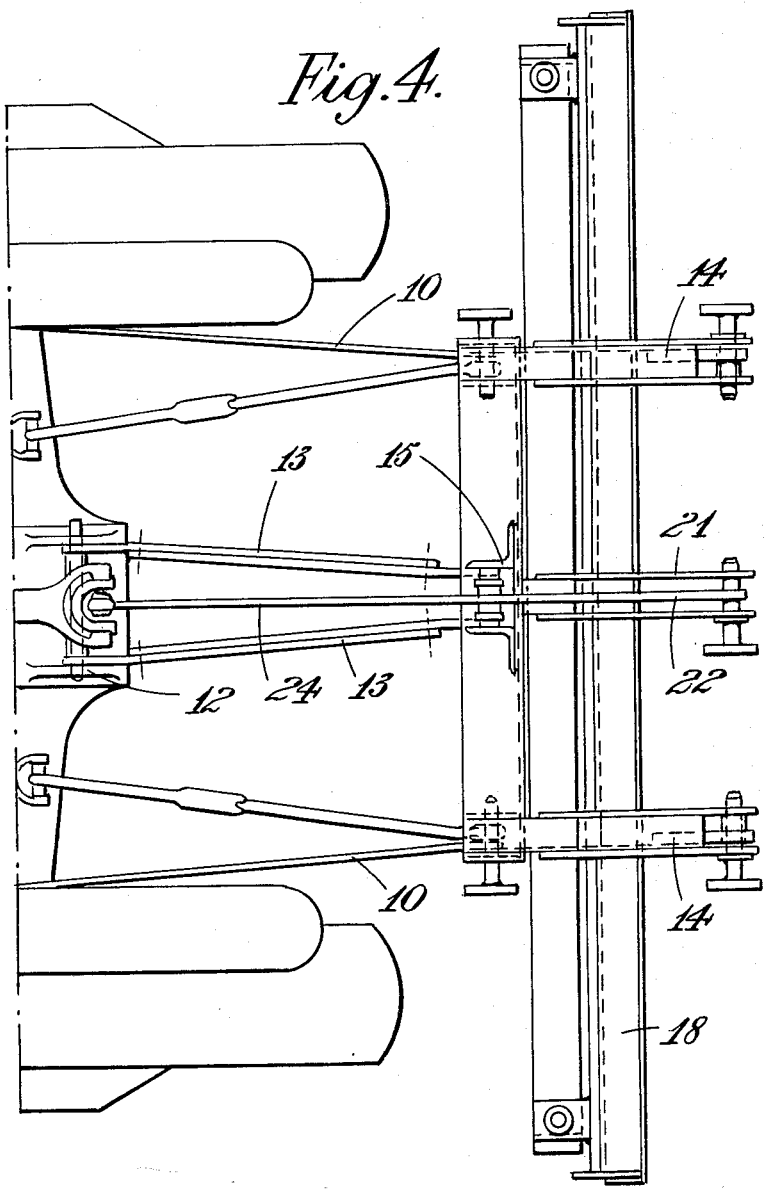

United States Patent Office 3,013,350
Patented Dec. 19, 1961

3,013,350
TOOL ATTACHMENTS FOR TRACTORS
John Vaudrey Fox, Tiddington, Stratford-upon-Avon, England, assignor to Bomford & Evershed Limited, Evesham, England, a company of Great Britain
Filed Sept. 19, 1960, Ser. No. 56,838
Claims priority, application Great Britain Sept. 21, 1959
6 Claims. (Cl. 37—144)

The invention relates to tools and tool attachments for use with tractors of the kind (herein called "tractors of the kind described") having raising and lowering means for a ground-engaging tool, which are operated by or under the control of, a device which is responsive to changes in ground thrust on the tool. It is one object of the invention to provide tool attachment means which under certain conditions, provide an improved control of the lifting and lowering means.

The invention provides tool attachment means for attaching a ground-engaging tool to a tractor of the kind described, having a pivot whereby the tool may be pivotally attached to the raising and lowering means of the tractor for lifting and lowering thereby, said pivot being in front of (i.e. further from the tractor than) the centre of gravity of the tool and of the ground-engaging part thereof when the tool is so attached, the tool attachment means also having means for connecting the tool to the thrust responsive means of the tractor, in such manner that the moment of the weight of the tool about the pivot acts on said thrust responsive means in a sense to operate the raising and lowering means to lower the tool and the moment of the working thrust on the tool about the pivot acts on the thrust responsive means in a sense to cause raising of the tool.

One form of tractor of the kind described has upper and lower links by which a ground working tool is coupled to the rear of the tractor, the tool being pivotally attached to the links at upper and lower positions respectively and the operative part of the tool projecting below the attachment to the lower link or links—usually there are two lower links spaced apart across the tractor— and also has means responsive to an increased thrust from the upper link derived from an increase in ground-working thrust on the tool, automatically to raise the tool and hence to decrease the load. Such an arrangement, which will hereinafter be called a three-link draft mechanism is embodied in the well known Ferguson tractors and can be made operative to maintain the load on the tool at a substantially constant value during forward movement of the tractor, the tool being drawn, by the links, behind the tractor. The invention, in a more specific form has for its object the provision of a ground-engaging tool which alone, or it may be in combination with minor modifications of the three link draft mechanism enables a tractor having such a draft mechanism to be operated in the reverse direction (i.e. to push the tool which may for example be a bull-dozer blade) and to maintain a substantially constant load on the tool by raising and lowering the tool.

In the said more specific form the invention provides a ground-engaging tool having a pivotal connection to the lower link of a tractor three-link draft mechanism as hereinbefore described characterised in that the connection is at a position in front of (i.e. further from the tractor than) the centre of gravity of the tool and the ground-engaging part thereof, whereby the weight of the tool provides a moment about the pivotal connection tending to oppose the moment of the working thrust on the tool about the connection, and wherein the tool is connected through the upper link to the thrust responsive means in such manner that the said moment of the weight of the tool tends to operate the raising and lowering means to lower the tool.

Specific constructions according to the invention will now be described with reference to the accompanying drawings in which:

FIGURE 1 is a side view showing one construction in which a bull-dozer blade is supported from a Ferguson tractor, the back axle casing and one wheel of the tractor being indicated, FIGURE 2 is a part plan of the construction shown in FIGURE 1, FIGURE 3 is a side view of a second construction in which a bull-dozer blade is supported from a Ferguson tractor, and FIGURE 4 is a plan of part of FIGURE 3 showing the attached tool.

In the drawings, the links 10, one at each side of the machine, are the normal lower links of the three-link draft mechanism of a Ferguson tractor and have the customary hydraulic lifting means (not shown). These links are pivoted to the axle casing at 11. Pivoted to existing brackets 12 on the casing there are two further links 13 added in accordance with the invention. At their front ends the links 10 and 13 are pivoted to a sub-frame which provides a forward extension 14 and an upright pillar 15. The links 10 and 13, the axle casing and the pillar 15 constitute a parallel motion system by which the sub-frame is constrained for substantially parallel up and down movement.

The bull-dozer blade 18 has a forwardly extending arm 19 by which the blade is pivoted, at 20, to the extension 14. The centre of gravity of the blade and its attachments is over the cutting edge of the blade and is well behind the pivot 20, so that the weight of the blade and attachments tends to cause rotation of the blade, clockwise as seen in FIGURE 1 or anti-clockwise as seen in FIGURE 3.

The blade also has an upwardly extending arm 21 which is connected by a link 22 to a reversing lever 23 pivoted on the pillar 15. The lower end of the lever is pivoted to the front end of link 24 which is the normal upper link of the three-link draft mechanism and is connected to the thrust responsive means of the tractor.

In the operation of the machine, if the blade is raised from the ground, the moment of the weight of the blade about pivot 20 produces a tension in link 24 which produces, through the hydraulic mechanism a tendency to lower the blade. If the blade is resting on the ground this tendency is removed and there may, in practice, be a tendency to lift the blade which then has a floating action.

Under working conditions the backward thrust on the blade from the material being moved produces compression in link 24 which tends to operate the hydraulic mechanism acting on links 10 to lift the frame and thereby to raise the blade. The weight of the blade acts against this tendency.

This action has particularly beneficial effects when the rear end of the tractor rises or falls on uneven ground. A tendency to rise is sensed by the blade 18 before any substantial upward motion is experienced, by a reduction in the downward pressure of the blade on the ground. The moment of the weight and inertia of the blade and arm 21 about pivot 20 however remains constant and is no longer equalled by the thrust of the ground on the blade. The blade and arm therefore tend to turn (clockwise as seen in FIGURE 1) about pivot 20 to produce a tension in link 24 which operates the hydraulic mechanism to tend to lower the blade. A tendency of the tractor rear end to fall is similarly sensed by an increase in the downward pressure of the blade on the ground causing the blade and arm to tend to turn (anti-clockwise as seen in FIGURE 1) in the direction to produce a compression in link 24 which operates the hydraulic mechanism to tend to lift the blade. Accordingly the blade tends to remain at a constant working depth in spite of pitching movements of the tractor.

In the mechanism shown in FIGURES 3 and 4 the link 22 has a number of holes 27 whereby the effective length of the link may be varied by using any one of the holes to form the pivotal connection to lever 23. By this means the attitude of the bull-dozer blade relative to the ground may be varied. The adjustment will also have the effect of varying the relation of the centre of gravity and the pivot 20 as well as the position of the centre of gravity relative to the cutting edge 28. In practice the adjustment most suited to the particular ground conditions encountered is found empirically.

I claim:
1. In the combination of a tractor and a ground working tool structure which is operable to engage and work the ground in advance of the tractor, support means for the tool structure pivoted at one end to the tractor for up and down movement and extending forwardly from the pivot, a pivotal attachment of the tool structure to the support means further in advance of the tractor than are both the center of gravity of the tool structure and the ground engaging part thereof, power-operated means on the tractor operable to raise and lower the support means about the pivotal attachment thereof to the tractor, a control for the raising and lowering means and an operative connection between the tool structure and the control by which relative rotation of the tool structure and the support means about the pivotal attachment therebetween in the sense in which the moment of the weight of the tool structure acts around the pivot operates the control to effect lowering of the support means and tool structure and relative rotation in the opposite sense operates the control to cause raising of the support means and tool structure.

2. In combination with a tractor of the kind having a draft mechanism comprising upper and lower links by which a ground working tool structure is coupled to the tractor, the links having means by which the tool structure is pivotally attached to the links at upper and lower positions respectively with the operative ground engaging part of the tool structure projecting below the attachment to the lower links, the tractor also having means responsive to an increase in thrust from the upper link automatically to raise the tool structure to decrease the load; a tool structure which is operable to engage and work the ground in advance of the tractor, means by which the tool structure is attached to the lower links and is supported for pivotal movement about an axis which is further in advance of the tractor than are both the center of gravity of the tool structure and the ground engaging part thereof, a pivotal attachment between the structure and the upper link and means whereby forward movement of the attachment to the upper link relative to the tractor is operative to produce thrust on the thrust responsive means thereby to cause the tool structure to be raised and vice versa.

3. The combination of a tractor with a tool structure and attachment means as claimed in claim 2 in which the attachment means comprise a sub-frame which is pivoted to the lower links and extends forwardly in advance thereof, the tool structure being pivoted to the sub-frame in advance of the attachment of the sub-frame to the lower links, said sub-frame also having an upward extension and a link above and substantially parallel to said lower links connecting the upward extension to the tractor.

4. The combination as claimed in claim 3 in which there is a lever pivotally supported on the upward extension, the upper link is connected between one end of the lever and the thrust responsive means and there is a further link connecting the other end of the lever to a part of the tool structure above the pivot thereof to the sub-frame.

5. The combination as claimed in claim 3 in which the upward extension of the sub-frame, the tractor, the lower links and said link connecting the upward extension to the tractor together provide a parallel motion linkage system for parallel up and down movement of the sub-frame.

6. The combination as claimed in claim 2 in which the tool structure includes a bulldozer blade having a ground engaging portion which slopes upwardly and rearwardly towards the tractor.

References Cited in the file of this patent

UNITED STATES PATENTS

| | | |
|---|---|---|
| 2,370,830 | Arps | Mar. 6, 1945 |
| 2,433,019 | Arps | Dec. 23, 1947 |
| 2,749,825 | Hirasuna | June 12, 1956 |
| 2,790,365 | Bunting | Apr. 30, 1957 |
| 2,924,285 | Dun Shane | Feb. 9, 1960 |